(12) United States Patent
Takimoto et al.

(10) Patent No.: US 10,859,520 B2
(45) Date of Patent: Dec. 8, 2020

(54) X-RAY DETECTION APPARATUS AND X-RAY DETECTION METHOD

(71) Applicant: HORIBA, Ltd., Kyoto (JP)

(72) Inventors: Tetsuya Takimoto, Kyoto (JP); Hideo Ueda, Kyoto (JP)

(73) Assignee: HORIBA, LTD., Kyoto (JP)

( * ) Notice: Subject to any disclaimer, the term of this patent is extended or adjusted under 35 U.S.C. 154(b) by 8 days.

(21) Appl. No.: 16/217,337

(22) Filed: Dec. 12, 2018

(65) Prior Publication Data

US 2019/0187078 A1    Jun. 20, 2019

(30) Foreign Application Priority Data

Dec. 15, 2017 (JP) .................. 2017-240833
Oct. 25, 2018 (JP) .................. 2018-201219

(51) Int. Cl.
| | | |
|---|---|---|
| *G01N 23/223* | (2006.01) | |
| *G01N 23/2209* | (2018.01) | |
| *G21K 1/06* | (2006.01) | |
| *H01J 35/02* | (2006.01) | |
| *H01J 35/00* | (2006.01) | |

(52) U.S. Cl.
CPC ....... *G01N 23/223* (2013.01); *G01N 23/2209* (2018.02); *G21K 1/06* (2013.01); *H01J 35/00* (2013.01); *H01J 35/02* (2013.01); *G01N 2223/315* (2013.01); *G01N 2223/637* (2013.01); *G21K 2201/062* (2013.01); *G21K 2201/064* (2013.01)

(58) Field of Classification Search
CPC .................................. H01J 35/02; H01J 35/186
See application file for complete search history.

(56) References Cited

U.S. PATENT DOCUMENTS

| | | | | |
|---|---|---|---|---|
| 6,606,371 | B2 * | 8/2003 | Antonell | G21K 1/06 378/84 |
| 6,829,327 | B1 * | 12/2004 | Chen | G01N 23/223 378/44 |
| 2006/0193438 | A1 * | 8/2006 | Radley | H05G 1/025 378/119 |

FOREIGN PATENT DOCUMENTS

| | | | |
|---|---|---|---|
| JP | H01-270652 A | 10/1989 | |
| JP | H08-220027 | * 8/1996 | ........... G01N 23/223 |

OTHER PUBLICATIONS

Machine Translation of JP H08-220027 (Year: 1996).*

* cited by examiner

*Primary Examiner* — Yara B Green
(74) *Attorney, Agent, or Firm* — Lucas & Mercanti, LLP

(57) ABSTRACT

An X-ray generation apparatus comprising: an X-ray generating unit; a dispersive crystal whose surface is irradiated with an X-ray generated from the X-ray generating unit in order to monochromatize the X-ray; and a detecting unit that detects an X-ray generated from a sample irradiated with the X-ray monochromatized by the dispersive crystal. The dispersive crystal has a single-bent shape containing the surface that is a concave surface formed by integrating concave curve lines continuously along an axis perpendicular to a plane including the concave curve line. A direction in which a position on the surface irradiated with the X-ray generated from the X-ray generating unit moves is the direction along the axis.

8 Claims, 12 Drawing Sheets

F I G. 2
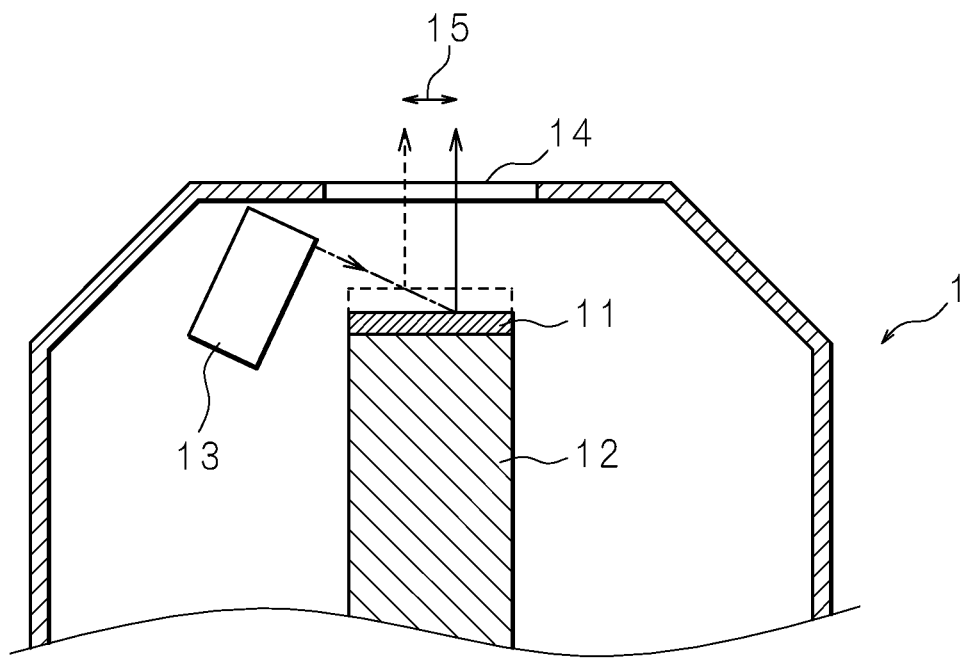

X-RAY DETECTION APPARATUS AND X-RAY DETECTION METHOD

CROSS-REFERENCE TO RELATED APPLICATION

This non-provisional application claims priority under 35 U.S.C. § 119(a) on Patent Application No. 2017-240833 filed in Japan on Dec. 15, 2017, and No. 2018-201219 filed in Japan on Oct. 25, 2018, the entire contents of which are hereby incorporated by reference.

FIELD

The present invention relates to an X-ray detection apparatus using a dispersive crystal and an X-ray detection method.

BACKGROUND

X-ray fluorescence analysis is a method for analyzing a component contained in a sample from X-ray fluorescence spectrum by irradiating the sample with X-ray and detecting X-ray fluorescence generated from the sample. As a method for the X-ray fluorescence analysis, there is a method for projecting the X-ray in a specific wavelength range to a sample through a dispersive crystal.

If the X-ray is projected to the dispersive crystal, the X-ray in the specific wavelength range which satisfies the Bragg condition is generated from the dispersive crystal. When an X-ray generating unit, the dispersive crystal and a sample are located at positions which satisfy the Bragg condition and the X-ray generated from the X-ray generating unit is projected to the dispersive crystal, the X-ray in a specific wavelength range is projected from the dispersive crystal to the sample. By restricting the wavelength of the X-ray projected to the sample, an S/N ratio (signal-to-noise ratio) when detecting the X-ray fluorescence is improved. Japanese Patent Application Laid-Open Publication No.H01-270652 has disclosed an X-ray detection apparatus using the dispersive crystal.

SUMMARY

There is an X-ray generating unit which generates the X-ray by making electron collide against a target. In such an X-ray generating unit, a position where the X-ray is generated inside the X-ray generating unit moves with an increase in the temperature of the X-ray generating unit, so that the optical axis of the X-ray may move. The X-ray detection apparatus using the dispersive crystal is so configured that the optical axis of the X-ray is located at a position where a lot of X-rays satisfies the Bragg condition. If the optical axis of the X-ray moves, the intensity of the X-ray which satisfies the Bragg condition changes. Thus, the intensity of the X-ray in a specific wavelength range projected to a sample changes, so that the intensity of detected X-ray fluorescence changes. Thus, with changes in the temperature of the X-ray generating unit, the intensity of the detected X-ray fluorescence fluctuates, thereby causing a measurement error in X-ray fluorescence analysis.

In views of such circumstances, it is an object to provide an X-ray detection apparatus and an X-ray detection method capable of reducing fluctuation of the intensity of the detected X-ray by inhibiting changes in the intensity of the X-ray projected to a sample.

An X-ray generation apparatus according to an aspect of the present disclosure comprises: an X-ray generating unit; a dispersive crystal whose surface is irradiated with an X-ray generated from the X-ray generating unit in order to monochromatize the X-ray; and a detecting unit that detects an X-ray generated from a sample irradiated with the X-ray monochromatized by the dispersive crystal. The dispersive crystal has a single-bent shape containing the surface that is a concave surface formed by integrating concave curve lines continuously along an axis perpendicular to a plane including the concave curve line. A direction in which a position on the surface irradiated with the X-ray generated from the X-ray generating unit moves is the direction along the axis.

According to an aspect of the present disclosure, the X-ray detection apparatus includes a dispersive crystal having a surface formed by integrating concave curve lines continuously along an axis perpendicular to a plane including the concave curve line. The X-ray is projected to the dispersive crystal from the X-ray generating unit, so that the X-ray in a specific wavelength range which satisfies the Bragg condition is generated from the dispersive crystal and projected to a sample. The X-ray generated in the sample is detected by a detecting unit. A direction in which a position irradiated with the X-ray on the surface of the dispersive crystal moves is the direction along the axis. Even if the position on the surface of the dispersive crystal where the X-ray is irradiated moves, an incident angle to the surface does not change, so that the intensity of the X-ray satisfying the Bragg condition does not change. Thus, the intensity of the X-ray in the specific wavelength range projected to the sample hardly changes.

The X-ray detection apparatus according to an aspect of the present disclosure further comprises a holding portion that holds a sample. The X-ray generating unit, the dispersive crystal and the holding portion are disposed such that the sample and a position where the X-ray is generated on the X-ray generating unit are located on a Rowland circle concerned with the surface. A direction in which the optical axis of the X-ray generated from the X-ray generating unit moves is along the normal vector of a plane including the Rowland circle.

According to an aspect of the present disclosure, an X-ray generation position of the X-ray generating unit and the sample are disposed on the Rowland circle concerned with the surface of the dispersive crystal. A direction in which the optical axis of the X-ray moves is along the normal vector of a plane including the Rowland circle. The direction in which the position irradiated with the X-ray on the surface of the dispersive crystal moves as the optical axis of the X-ray moves is the direction along the axis of the dispersive crystal.

In the X-ray detection apparatus according to an aspect of the present disclosure, the X-ray generating unit includes: an electron generating unit; and a target that generates an X-ray when the electron generated from the electron generating unit collides with the target. The electron collides with a surface of the target nonvertically.

An X-ray generation apparatus according to an aspect of the present disclosure comprises: an X-ray generating unit; a dispersive crystal whose surface is irradiated with an X-ray generated from the X-ray generating unit in order to monochromatize the X-ray; and a detecting unit that detects an X-ray generated from a sample irradiated with the X-ray monochromatized by the dispersive crystal, the X-ray generation apparatus. The dispersive crystal has a single-bent shape containing the surface that is a concave surface formed by integrating concave curve lines continuously along an axis perpendicular to a plane including the concave curve line. The X-ray generating unit includes: an electron generating unit; and a target that generates an X-ray when the electron generated from the electron generating unit collides with the target. The electron collides with a surface of the target nonvertically. A direction in which the position irradiated with the X-ray on the surface moves as the optical axis of the X-ray generated from the X-ray generating unit shifts due to thermal expansion of the target is along the axis.

According to an aspect of the present disclosure, the X-ray generating unit generates the X-ray when an electron generated from the electron generating unit collides with the surface of a target nonvertically. The surface of the target moves due to thermal expansion of the target so that the position on the target where the electron collides changes. As a result, the position where the X-ray is generated changes, and consequently, the optical axis of the X-ray moves.

The X-ray detection apparatus according to an aspect of the present disclosure further comprises: a spectrum generating unit that generates a spectrum of the X-ray detected by the detecting unit; an analyzing unit that analyzes an element based on the spectrum generated by the spectrum generating unit; and a display unit that displays a result of the element analysis.

According to an aspect of the present disclosure, the X-ray detection apparatus analyzes an element based on a spectrum of the X-ray generated from the sample and displays an analysis result. For example, concentration of the element contained in the sample can be investigated.

An X-ray detection method according to an aspect of the present disclosure comprises: using an X-ray generating unit, a dispersive crystal which has a surface that is a concave surface formed by integrating concave curve lines continuously along an axis perpendicular to a plane including the concave curve line and whose surface is irradiated with an X-ray generated from the X-ray generating unit in order to monochromatize the X-ray, and a detecting unit that detects an X-ray; disposing the X-ray generating unit and the spectacle crystal such that a direction in which a position on the surface irradiated with the X-ray generated from the X-ray generating unit is along the axis; projecting the X-ray monochromatized by the dispersive crystal to liquid sample; and detecting an X-ray generated from the sample irradiated with the X-ray by means of the detecting unit.

According to an aspect of the present disclosure, the X-ray is projected to liquid sample and the X-ray generated from the sample is detected. If the component is dispersed equally in the liquid sample, even if a position on the sample where the X-ray is irradiated changes, the X-ray generated from the sample does not change, thereby enabling stable X-ray analysis.

According to an aspect of the present disclosure, the intensity of the X-ray in the specific wavelength range projected to the sample hardly changes, thereby reducing fluctuation in the intensity of the detected X-ray. Thus, the aspect of the present disclosure exerts excellent effects including reduction of measurement error in the X-ray analysis.

The above and further objects and features will more fully be apparent from the following detailed description with accompanying drawings.

BRIEF DESCRIPTION OF DRAWINGS

FIG. 2 is a schematic sectional view illustrating a part of an inside structure of an X-ray generating unit;

DETAILED DESCRIPTION

Hereinafter, the present invention will be described specifically based on drawings which illustrate embodiments thereof.

First Embodiment

Figure 1:
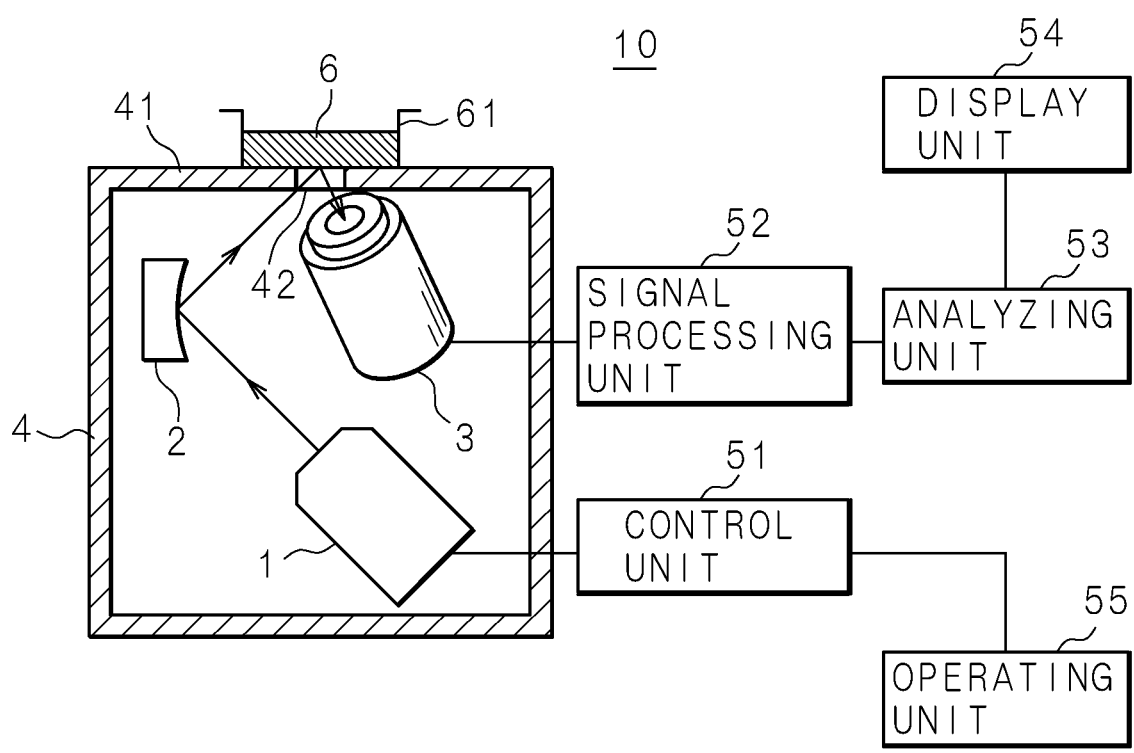
FIG. 1 is a block diagram illustrating a structure of an X-ray detection apparatus.

FIG. 1 is a block diagram illustrating a structure of an X-ray detection apparatus 10. The X-ray detection apparatus 10 is an X-ray fluorescence analyzing apparatus. The X-ray detection apparatus 10 includes an X-ray generating unit 1, a dispersive crystal 2 which is irradiated with an X-ray generated from the X-ray generating unit 1 in order to monochromatize the X-ray, and a detecting unit 3 for detecting an X-ray. The dispersive crystal 2 is, for example, a single crystal. The component of the dispersive crystal 2 is, for example, carbon. In the dispersive crystal 2, at least, a portion near the surface irradiated with an X-ray is composed of crystal. A lattice constant of the crystal is a predetermined value and, in X-rays projected to the surface of the dispersive crystal 2, an X-ray in a specific wavelength range which satisfies the Bragg condition is diffracted by the dispersive crystal 2, so that the diffracted X-ray is emitted from the surface in a direction which satisfies the Bragg condition. Consequently, the monochromatized X-ray is generated. The monochromatization means extracting the X-ray in the specific wavelength range by diffraction by the dispersive crystal 2. The detecting unit 3 outputs a signal proportional to an energy of the detected X-ray. The detecting unit 3 is, for example, an X-ray detector using a semiconductor device as a detection element.

The X-ray detection apparatus 10 has a depressurizing container 4 capable of depressurizing the inside space thereof. The X-ray generating unit 1, the dispersive crystal 2 and the detecting unit 3 are disposed inside the depressurizing container 4. A part of the X-ray generating unit 1 or the detecting unit 3 may be disposed outside the depressurizing container 4. The depressurizing container 4 is composed of material capable of blocking the X-ray. The depressurizing container 4 has a top board 41. The top board 41 is a part which forms an upper side of the depressurizing container 4. The top board 41 has an opening 42 which goes through the top board 41 vertically. A liquid sample 6 contained in a cup-shaped sample container 61 is mounted at a position where it blocks the opening 42 in the top board 41. The top board 41 holds the sample 6 after the sample 6 is mounted. The top board 41 corresponds to a holding portion or a board member. The dispersive crystal 2 is disposed at a position which allows the X-ray satisfying the Bragg condition to pass the opening 42. The X-ray passing the opening 42 is projected to the sample 6, so that the X-ray fluorescence is generated from the sample 6. Then, the X-ray fluorescence passes the opening 42 and the X-ray fluorescence is detected by the detecting unit 3. In FIG. 1, the X-ray including the X-ray fluorescence is represented with a solid line arrow.

A signal processing unit 52 for processing a signal output from the detecting unit 3 is connected to the detecting unit 3. The signal processing unit 52 counts signals of each value output by the detecting unit 3 and executes a processing of generating a relationship between the energy and count number of the detected X-ray fluorescence, that is, X-ray fluorescence spectrum. The signal processing unit 52 corresponds to a spectrum generating unit. The signal processing unit 52 is connected to an analyzing unit 53. The analyzing unit 53 is constructed to contain an arithmetic operation unit for performing arithmetic operation and a memory which stores data. The signal processing unit 52 outputs data which represents a generated spectrum to the analyzing unit 53. The analyzing unit 53 receives data input from the signal processing unit 52 and executes qualitative analysis or quantitative analysis on an element contained in the sample 6 based on the spectrum represented by the input data. For example, the analyzing unit 53 calculates a concentration of an impurity such as sulfur contained in the liquid sample 6 such as oil, for example. A display unit 54 such as a liquid crystal display is connected to the analyzing unit 53. The analyzing unit 53 displays an image showing a result of the element analysis on the display unit 54. The display unit 54 may display X-ray fluorescence spectrum. Further, the analyzing unit 53 may generate the X-ray fluorescence spectrum although the signal processing unit 52 may not generate the X-ray fluorescence spectrum. In this case, the analyzing unit 53 serves as a spectrum generating unit at the same time.

The X-ray detection apparatus 10 further includes a control unit 51. The X-ray generating unit 1 is connected to the control unit 51. Further, an operating unit 55, such as a keyboard and a pointing device, which accepts a user's operation is connected to the control unit 51. The control unit 51 controls the X-ray generating unit 1 and the operating unit 55. Further, the control unit 51 accepts a user's processing instruction when the user operates the operating unit 55 and controls each unit of the X-ray detection apparatus 10 in response to an accepted processing instruction. In the meantime, the signal processing unit 52, the analyzing unit 53 and the display unit 54 may be connected to the control unit 51 and controlled by the control unit 51. Further, the control unit 51 and the analyzing unit 53 may be constructed in the same unit.

FIG. 2 is a schematic sectional view illustrating a part of an inside structure of the X-ray generating unit 1. The X-ray generating unit 1 is a reflection type X-ray tube using a filament unit 13 provided for an end window. A plate-like target 11 is coupled with a front end of a column-like axial material 12. The axial material 12 and the target 11 are made of metal. For example, the axial material is made of copper and the target 11 is made of silver. The X-ray generating unit 1 contains the filament unit 13 which generates thermal electron. The filament unit 13 corresponds to an electron generating unit. The thermal electron generated by the filament unit 13 is accelerated by electric field generated within the X-ray generating unit 1 by an electrode (not shown) and the thermal electron collides with the target 11. After the thermal electron collides with the target 11, an X-ray is generated from the target 11. The generated X-ray is emitted from an emission port 14. An X-ray generation position is a position where the thermal electron collides on the surface of the target 11.

In FIG. 2, a flow of the thermal electron is represented with a dot-dash line with an arrow. The thermal electron collides with the surface of the target 11 nonvertically. When the thermal electron collides with the target 11, heat is generated so that the heat is conducted from the target 11 to the axial material 12. Thus, the axial material 12 or the target 11 may be performed thermal expansion by the heat. A position of the surface of the target 11 changes due to the thermal expansion. Speaking more in detail, the position of the surface of the target 11 changes so as to come close to the thermal electron which is going to collide with it due to the thermal expansion. In FIG. 2, the surface of the target 11 at the time of the thermal expansion is indicated with a dotted line. When the position of the surface of the target 11 changes, a position where thermal electron collides with the target 11 changes, so that a position where the X-ray is generated changes. Because the thermal electron collides with the surface of the target 11 nonvertically, the position where the X-ray is generated moves in a direction along the surface of the target 11. The optical axis of the X-ray generated by the target is perpendicular to the surface. Because the position where the X-ray is generated moves in a direction along the surface of the target 11, the optical axis of the generated X-ray moves in the direction along the surface. At this time, the optical axis of the X-ray moves almost in parallel. Thus, the optical axis of the X-ray moves linearly when viewed from a side opposite to the surface of the target 11. In FIG. 2, the optical axis of an X-ray generated without the thermal expansion is indicated with a solid line arrow while the optical axis of an X-ray generated at the time of the thermal expansion is indicated with a dotted line with arrows. A direction 15 in which the optical axis of the X-ray moves linearly is indicated with a two-headed arrow.

Figure 3:
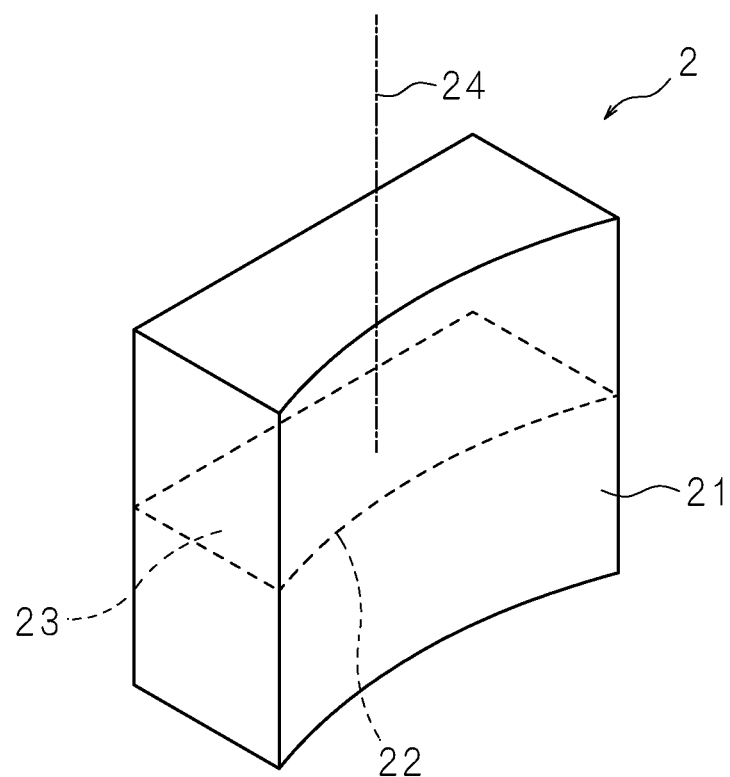
FIG. 3 is a perspective view illustrating a dispersive crystal.

FIG. 3 is a perspective view illustrating the dispersive crystal 2. The dispersive crystal 2 has a surface 21 which is irradiated with the X-ray from the X-ray generating unit 1. The surface 21 is a concave surface formed by integrating concave curve lines 22 continuously along an axis 24 perpendicular to a plane 23 including the concave curve line 22. For example, the shape of the surface 21 is the same shape as a part of the internal surface of a cylinder. The axis 24 is parallel to a central axis of the cylinder. That is, the dispersive crystal 2 has a single-bent shape. The shape of the surface 21 may be other shape than the internal surface of the cylinder. For example, the shape of the surface 21 may be so formed that the concave curve line 22 is parabolic.

Figure 4:
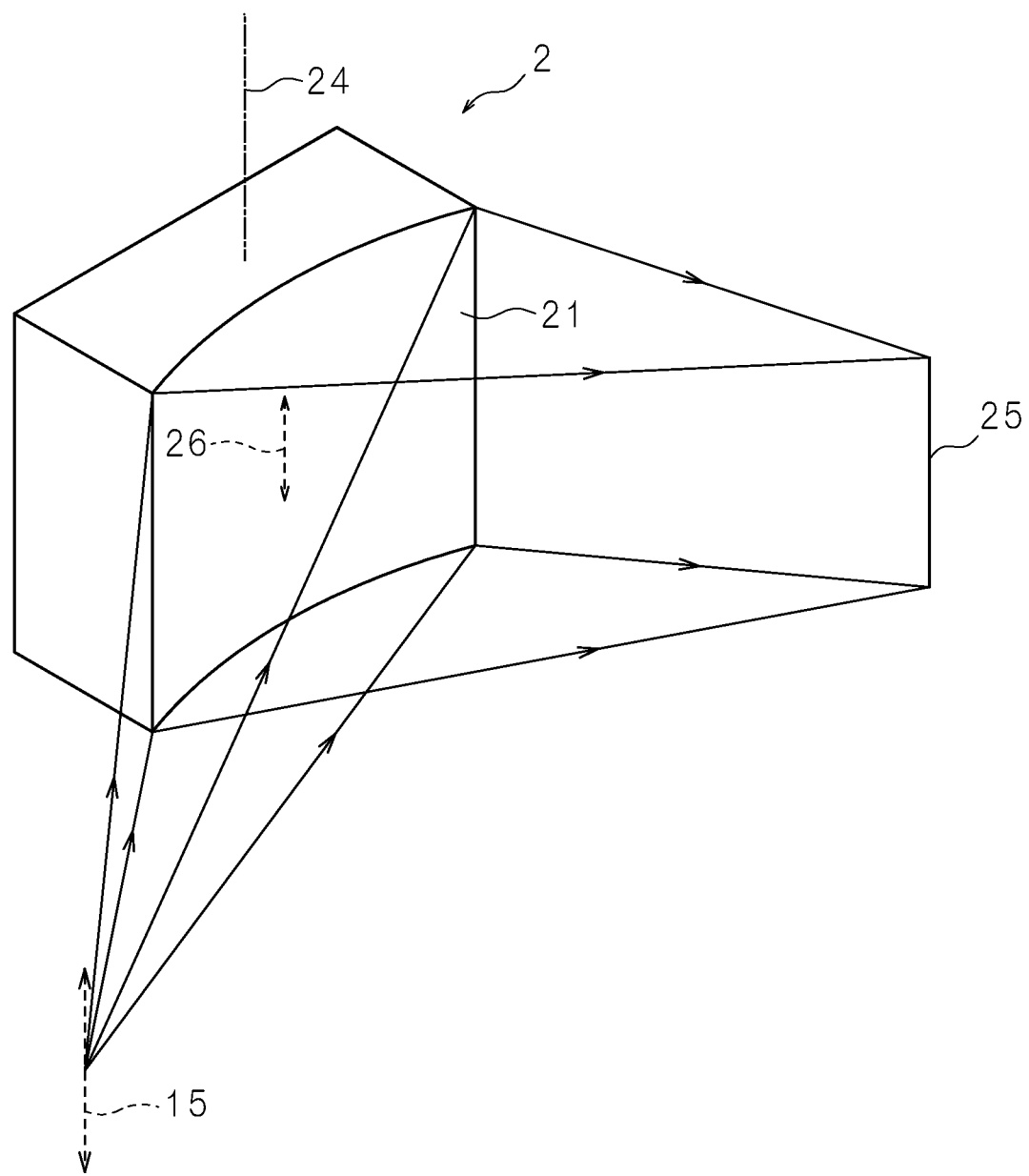
FIG. 4 is a schematic view illustrating a condition in which an X-ray is converged by the dispersive crystal.

FIG. 4 is a schematic view illustrating a condition in which an X-ray is converged by the dispersive crystal. In FIG. 4, the X-ray is indicated with a solid line arrow. Because of the single-bent shape, the X-ray in a specific wavelength range emitted from the surface 21 is converged linearly. That is, the X-ray is converged into a focal line 25. When a position on the surface 21 where the X-ray is irradiated changes in a direction along the axis 24, an incident angle of the X-ray to the surface 21 does not change, while its emission angle does not change. When the X-ray enters the surface 21 at an incident angle which satisfies the Bragg condition, even if a position irradiated with the X-ray changes in a direction along the axis 24, the incident angle does not change, and therefore the Bragg condition is still satisfied. Thus, when the position on the surface 21 where the X-ray is irradiated changes in a direction along the axis 24, the intensity of the X-ray which satisfies the Bragg condition does not change, so that the intensity of the X-ray in the specific wavelength range generated by the dispersive crystal 2 does not change. Further, if the position on the surface 21 where the X-ray is irradiated changes in a direction along the axis 24, the X-ray in the specific wavelength range emitted from the surface 21 is converged into the focal line 25.

The X-ray generating unit 1 and the dispersive crystal 2 are arranged in such a positional relationship that as the optical axis of the X-ray generated by the X-ray generating unit 1 moves, a direction 26 in which the position irradiated with the X-ray on the surface 21 moves is the direction along the axis 24. In FIG. 4, a direction 15 in which the optical axis of the X-ray generated by the X-ray generating unit 1 moves and the direction 26 in which the position irradiated with the X-ray on the surface 21 moves are indicated with a dotted line with arrows. The direction 26 in which the position irradiated with the X-ray on the surface 21 moves is the direction along the axis 24. Thus, even when the optical axis of the X-ray generated in the X-ray generating unit 1 moves, the incident angle of the X-ray to the surface 21 does not change, so that the intensity of the X-ray which satisfies the Bragg condition does not change. As a result, the intensity of the X-ray in the specific wavelength range generated in the dispersive crystal 2 does not change.

Figure 5:
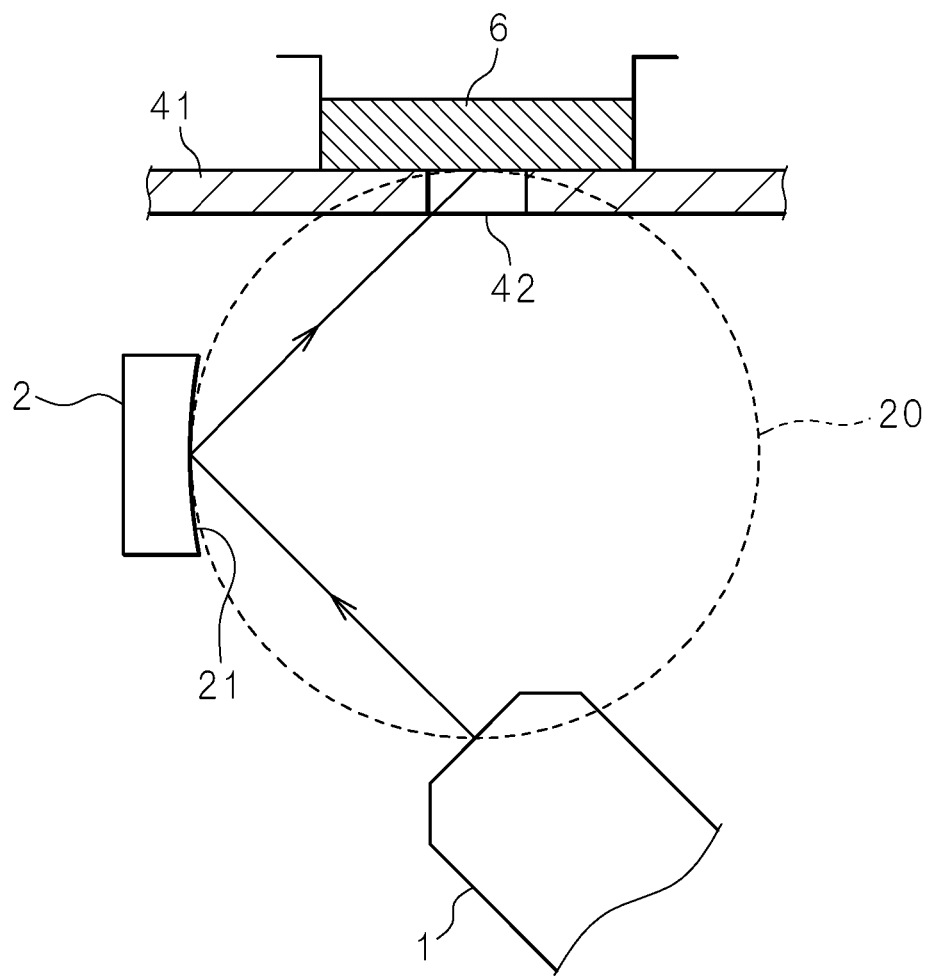
FIG. 5 is a schematic view illustrating a positional relationship between the X-ray generating unit, the dispersive crystal and a top board.

FIG. 5 is a schematic view illustrating a positional relationship between the X-ray generating unit 1, the dispersive crystal 2 and a top board 41. The dispersive crystal 2 is of Johann type. A Rowland circle 20 concerned with the dispersive crystal 2 is a circle having a diameter that is a line connecting a center of curvature of the surface 21 which is a concave surface and a central point on the surface 21. The axis 24 is perpendicular to a plane including the Rowland circle 20. The X-ray generating unit 1 is disposed with respect to the dispersive crystal 2 such that its X-ray generating position is located on the Rowland circle 20. For example, in a state in which the axial material 12 or the target 11 expands thermally, the X-ray generating position is located on the Rowland circle 20. As for a positional relationship between the dispersive crystal 2 and the top board 41, the sample 6 mounted at a position which blocks the opening 42 in the top board 41 is located on the Rowland circle 20. Under the above-described positional relationship, the X-ray generated in the X-ray generating unit 1 enters the dispersive crystal 2 and then, the X-ray in the specific wavelength range generated in the dispersive crystal 2 is converged in the sample 6. As a result, the intensity of the X-ray projected to the sample 6 increases, so that the intensity of the X-ray fluorescence generated from the sample 6 also increases, thereby the accuracy in the X-ray fluorescence analysis being improved.

The X-ray generating unit 1 is disposed with respect to the dispersive crystal 2 such that the direction 15 in which the optical axis of the X-ray moves is along the normal vector of a plane including the Rowland circle 20. Thus, when the optical axis of the X-ray moves, a position where the optical axis of the X-ray crosses the surface 21 of the dispersive crystal 2 moves in a direction along the axis 24 of the dispersive crystal 2. That is, the direction 26 in which the position irradiated with the X-ray on the surface 21 moves as the optical axis of the X-ray moves is the direction along the axis 24. The incident angle of the X-ray to the surface 21 hardly changes, so that the X-ray in the specific wavelength range generated in the dispersive crystal 2 is converged into the sample 6 like before the optical axis of the X-ray moves. Thus, even when the optical axis of the X-ray generated in the X-ray generating unit 1 moves, changes in the intensity of the X-ray projected to the sample 6 is inhibited.

In the meantime, the dispersive crystal 2 may be of Johansson type. In this case, the Rowland circle concerned with the dispersive crystal 2 is a circle having a radius that is a line connecting a center of curvature of the surface 21 which is the concave surface and a central point on the surface 21. In this case also, as for the positional relationship between the X-ray generating unit 1, the dispersive crystal 2 and the top board 41, the X-ray generation position is located on the Rowland circle 20 and the sample 6 is located on the Rowland circle 20. Further, the X-ray generating unit 1 is disposed with respect to the dispersive crystal 2 such that the direction 15 in which the optical axis of the X-ray moves is along the normal vector of the plane including the Rowland circle 20. Like a case where the dispersive crystal 2 is of Johann type, the direction 26 in which the position irradiated with the X-ray on the surface 21 moves as the optical axis of the X-ray moves is the direction along the axis 24 of the dispersive crystal 2. Thus, even when the optical axis of the X-ray generated in the X-ray generating unit 1 moves, fluctuation in the intensity of the X-ray projected to the sample 6 is inhibited.

The opening 42 in the top board 41 is formed at a position where the X-ray in the specific wavelength range satisfying the Bragg condition generated in the dispersive crystal 2 passes. As a result, the X-ray in the specific wavelength range spectrally diffracted by the dispersive crystal 2 is projected to the sample 6. Even when the optical axis of the X-ray generated in the X-ray generating unit 1 moves, because the direction 26 in which the position irradiated with the X-ray on the surface 21 changes is the direction along the axis 24, the intensity of the X-ray satisfying the Bragg condition does not change, so that the intensity of the X-ray in the specific wavelength range generated in the dispersive crystal 2 does not change. Thus, the intensity of the X-ray in the specific wavelength range projected to the sample 6 hardly changes, so that the intensity of the X-ray fluorescence generated from the sample 6 hardly changes. As a result, the intensity of the X-ray fluorescence detected by the detecting unit 3 hardly changes. That is, according to the present embodiment, fluctuation in the intensity of the detected X-ray fluorescence decreases. Because the fluctuation in the intensity of the detected X-ray fluorescence decreases, a measurement error of the X-ray fluorescence analysis is reduced.

Figure 6:
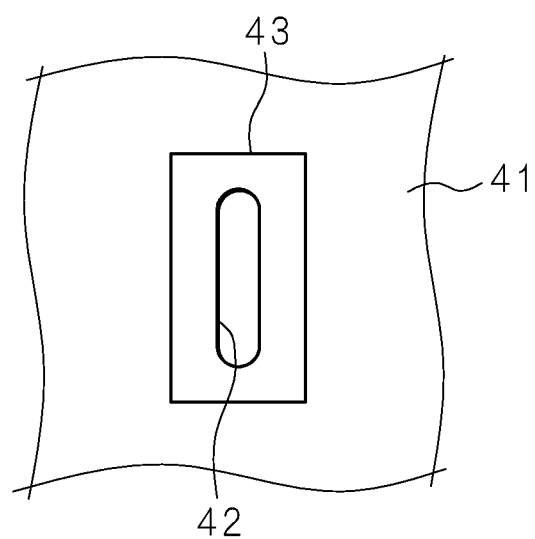
FIG. 6 is a schematic plan view of the top board according to a first embodiment.
Figure 7:
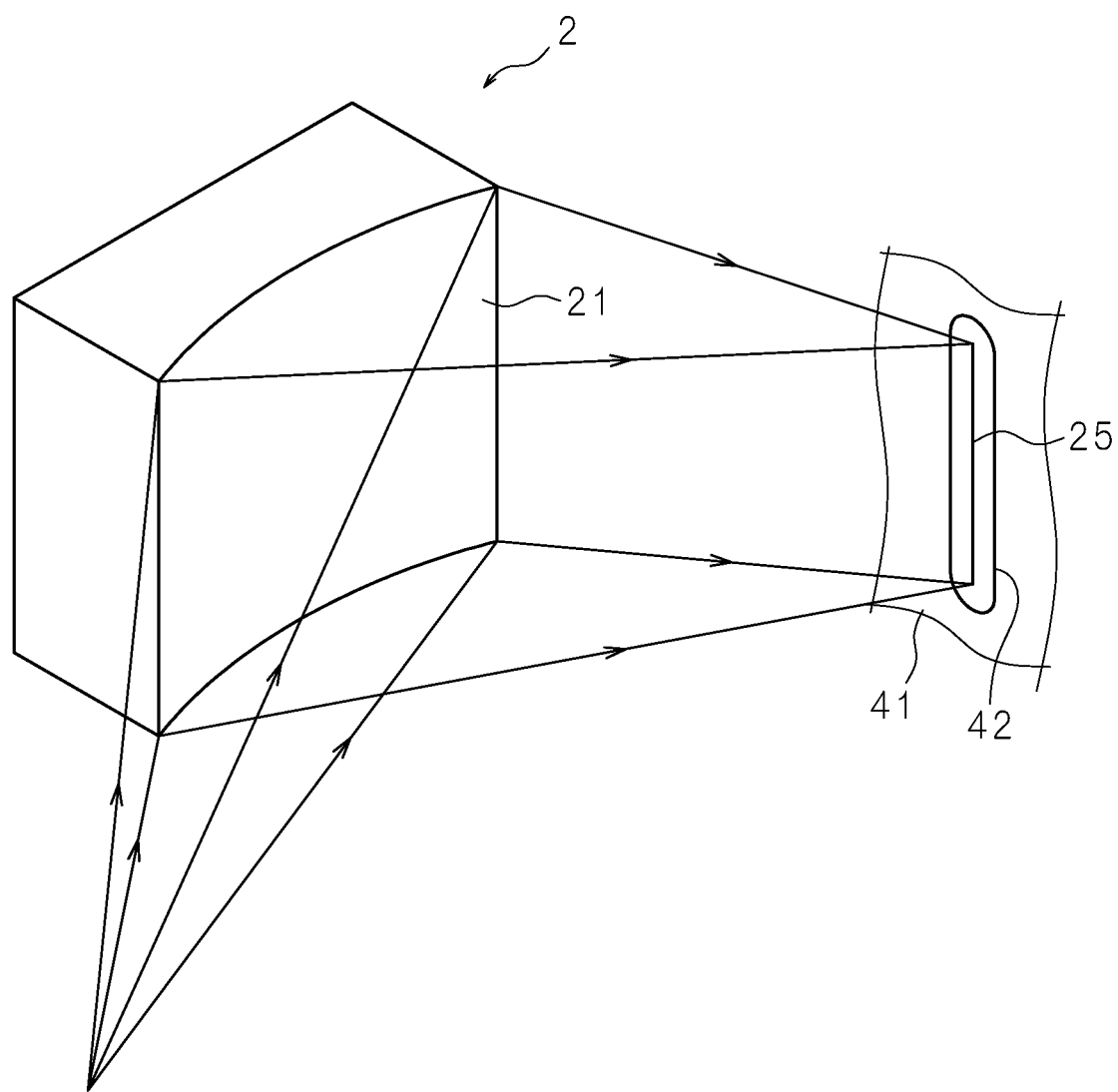
FIG. 7 is a schematic view illustrating a positional relationship between the dispersive crystal and the top board according to the first embodiment.

FIG. 6 is a schematic plan view of the top board 41 according to a first embodiment. FIG. 7 is a schematic view illustrating a positional relationship between the dispersive crystal 2 and the top board 41 according to the first embodiment. The opening 42 passes through the top board 41. At least, when the X-ray detection apparatus 10 is operated, the opening 42 is blocked by an X-ray transmission film 43. The X-ray transmission film 43 is bonded onto the top board 41 so as to block the opening 42. The sample 6 contained in the sample container 61 is mounted on the opening 42 and the X-ray transmission film 43. In the example illustrated in FIG. 6, the sample 6 is disposed as if it conceals the opening 42 and the X-ray transmission film 43. The X-ray transmission film 43 allows the X-ray in the specific wavelength range generated by the dispersive crystal 2 and projected to the sample 6 to pass through, and allows the X-ray fluorescence generated by the sample 6 to pass through.

The shape of the opening 42 is an elongated hole, different from a perfect circle. As described previously, the X-ray in the specific wavelength range generated by the dispersive crystal 2 is converged linearly to the focal line 25. As for a positional relationship between the dispersive crystal 2 and the top board 41, a longitudinal direction of the focal line 25 for the X-ray in the specific wavelength range generated by the dispersive crystal 2 and projected to the sample 6 is the direction along a longitudinal direction of the opening 42. As a result, the opening 42 is formed in the shape of an elongated hole along the longitudinal direction of the focal line 25. The length of the opening 42 in a direction perpendicular to the longitudinal direction of the focal line 25 is smaller than the length of the opening 42 in the direction along the longitudinal direction of the focal line 25. Because the shape of the opening 42 is an elongated shape which is long along the longitudinal direction, the X-ray converged to the focal line 25 can pass the opening 42. The X-ray in the specific wavelength range generated in the dispersive crystal 2 can pass the opening 42 more easily. Further, the X-ray can be inhibited from being projected to edges of the opening 42. For example, an angle between the longitudinal direction of the focal line 25 and the longitudinal direction of the opening 42 is adjusted to be within a range which inhibits a part of the focal line 25 from overlapping the edges of the opening 42. If the X-ray is inhibited from being projected to the edges of the opening 42, the fluctuation in the intensity of the X-ray projected to the sample 6 is inhibited, so that the fluctuation in the intensity of the X-ray fluorescence generated from the sample 6 and detected by the detecting unit 3 is also inhibited. Further, X-ray fluorescence not originating from the sample 6 is inhibited from being generated from the edges of the opening 42, and therefore, deterioration in accuracy of the X-ray fluorescence analysis, caused by X-ray fluorescence not originating from the sample 6, is inhibited.

As compared to a case where the opening is just enlarged for the X-ray to pass the opening, the area of the opening 42 in the present embodiment is small. By forming the opening 42 in an elongated shape, the X-ray in the specific wavelength range generated in the dispersive crystal 2 can pass the opening 42 more easily without forming the opening 42 larger than necessary. Because the opening 42 is not larger than necessary, a possibility that the X-ray transmission film 43 may be damaged is low. Because the opening 42 is not larger than necessary and the shape of the opening 42 is elongate, flexure of the X-ray transmission film 43 due to depressurization is inhibited. For example, in the elongate opening 42, a distance from the center of the opening 42 to edges thereof is small than a circular opening even if their areas are the same, thereby reducing flexure of the X-ray transmission film 43. Because the flexure of the X-ray transmission film 43 is small, the amount of air which enters in between the sample 6 and the X-ray transmission film 43 is small. As a result, attenuation of the X-ray projected to the sample 6 and the X-ray fluorescence generated from the sample 6 is inhibited. Thus, fluctuation of the intensity of the X-ray fluorescence detected by the detecting unit 3 is inhibited. Further, the thickness of the X-ray transmission film 43 can be reduced compared to a conventional example. The flexure increases as the thickness of the X-ray transmission film 43 decreases. However, according to the present embodiment, the flexure can be reduced and thus, the thickness of the X-ray transmission film 43 can be reduced. If the thickness of the X-ray transmission film 43 is small, the attenuation of the X-ray passing the X-ray transmission film 43 decreases. Consequently, the intensity of the X-ray projected to the sample 6 is improved thereby the intensity of the detected X-ray fluorescence being improved.

The opening 42 has a shape having a single major axis. Here, the major axis is the longest axis of a plurality of axes which are straight lines drawn inside the opening 42 through the center of the opening 42. The major axis of the opening 42 is only one and all other axes crossing the major axis are shorter than the major axis. For example, the shape of the opening 42 may be oval or rectangular. Edges along the longitudinal direction of the opening 42 are desired to be parallel to each other. If the edges along the longitudinal direction of the opening 42 are parallel to each other, an area of the opening 42 is smaller than a case where the shape of the edges is expanded outward. If the area of the opening 42 is smaller, flexure of the X-ray transmission film 43 due to depressurization is inhibited, thereby inhibiting the attenuation of the X-ray. Further, if the edges along the longitudinal direction of the opening 42 are parallel to each other, a distance from the center of the opening 42 to the edge is smaller than a case where the shape of the edge is expanded outward, so that the flexure of the X-ray transmission film 43 decreases.

As described in detail above, according to the first embodiment, the direction 26 in which the position irradiated with the X-ray on the surface 21 of the dispersive crystal 2 moves as the optical axis of the X-ray generated in the X-ray generating unit 1 moves is the direction along the axis 24 of the dispersive crystal 2. Even if the position on the surface 21 where the X-ray is irradiated moves, the intensity of the X-ray which satisfies the Bragg condition does not change and then, the intensity of the X-ray in the specific wavelength range generated in the dispersive crystal 2 does not change. Thus, the intensity of the X-ray in the specific wavelength range projected to the sample 6 hardly changes, so that the fluctuation in the intensity of the detected X-ray fluorescence is reduced. Thus, the measurement error of the X-ray fluorescence analysis is reduced.

According to the first embodiment, the X-ray generation position of the X-ray generating unit 1, the surface 21 of the dispersive crystal 2 and the sample 6 are disposed on the Rowland circle 20. As a result, the X-ray in the specific wavelength range generated in the dispersive crystal 2 is converged into the sample 6. The intensity of the X-ray projected to the sample 6 increases and then, the intensity of the detected X-ray fluorescence increases, thereby the accuracy of the X-ray fluorescence analysis being improved. Specially, the direction 15 in which the optical axis of the X-ray moves is along the normal vector of a plane including the Rowland circle 20. As a result, the direction 26 in which the position irradiated with the X-ray on the surface 21 moves as the optical axis of the X-ray moves is the direction along the axis 24. The incident angle of the X-ray to the surface 21 hardly changes, and consequently, the intensity of the X-ray satisfying the Bragg condition hardly changes. Thus, the fluctuation of the intensity of the detected X-ray fluorescence is reduced, thereby reducing the measurement error of the X-ray fluorescence.

In the first embodiment, the liquid sample 6 is irradiated with the X-ray to execute the X-ray fluorescence analysis. If the component in the liquid sample 6 is dispersed equally, even if the position on the sample 6 where the X-ray is irradiated moves as the optical axis of the X-ray generated in the X-ray generating unit 1 moves, the X-ray fluorescence generated from the sample 6 does not change, thereby enabling stable X-ray fluorescence analysis. Although the X-ray projected to the sample 6 is converged linearly, if the component in the liquid sample 6 is dispersed equally, the same X-ray fluorescence is generated as when the X-ray is converged to a single point, thereby enabling stable X-ray fluorescence analysis.

Further, according to the first embodiment, the shape of the opening 42 in the top board 41 is elongate along the longitudinal direction of the focal line 25 where the X-ray projected to the sample 6 is converted linearly. The X-ray projected to the sample 6 can pass the opening 42 easily without forming the opening 42 larger than necessary. The fluctuation in the intensity of the X-ray projected to the sample 6 is inhibited, so that the fluctuation in the intensity of the X-ray fluorescence generated from the sample 6 is also inhibited. Because the opening 42 is not larger than necessary, a possibility that the X-ray transmission film 43 may be damaged is low and flexure of the X-ray transmission film 43 due to depressurization is inhibited. Because the flexure of the X-ray transmission film 43 is inhibited, the attenuation of the X-ray 6 is inhibited. Thus, the fluctuation of the intensity of the X-ray fluorescence detected by the detecting unit 3 is inhibited, the accuracy in the X-ray fluorescence analysis is improved.

In the meantime, although the first embodiment indicates an example that the X-ray generating unit 1 is a reflection type X-ray tube, the X-ray generating unit 1 may be a transmission type X-ray tube. Further, although the first embodiment indicates a configuration in which the detecting unit 3 detects an X-ray fluorescence generated from the sample 6, the X-ray detection apparatus 10 may be configured to detect other X-ray than the X-ray fluorescence with the detecting unit 3. Further, although the first embodiment indicates a configuration for energy dispersion type which detects X-rays separately for each energy, the X-ray detection apparatus 10 may be configured in wavelength dispersion type which detects X-rays separately for each wavelength. Further, although the first embodiment indicates an example that the sample 6 is a liquid sample, the X-ray detection apparatus 10 can handle a solid sample.

Second Embodiment

Figure 8:
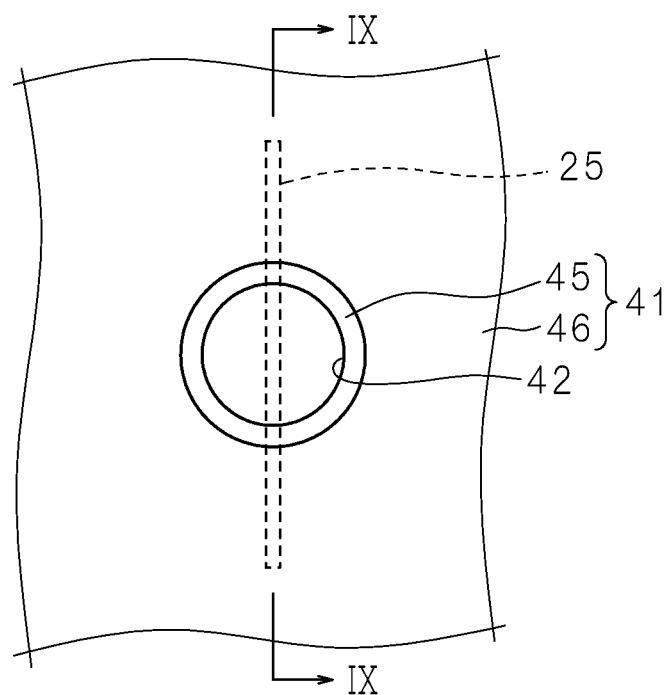
FIG. 8 is a schematic plan view of the top board according to a second embodiment.
Figure 9:
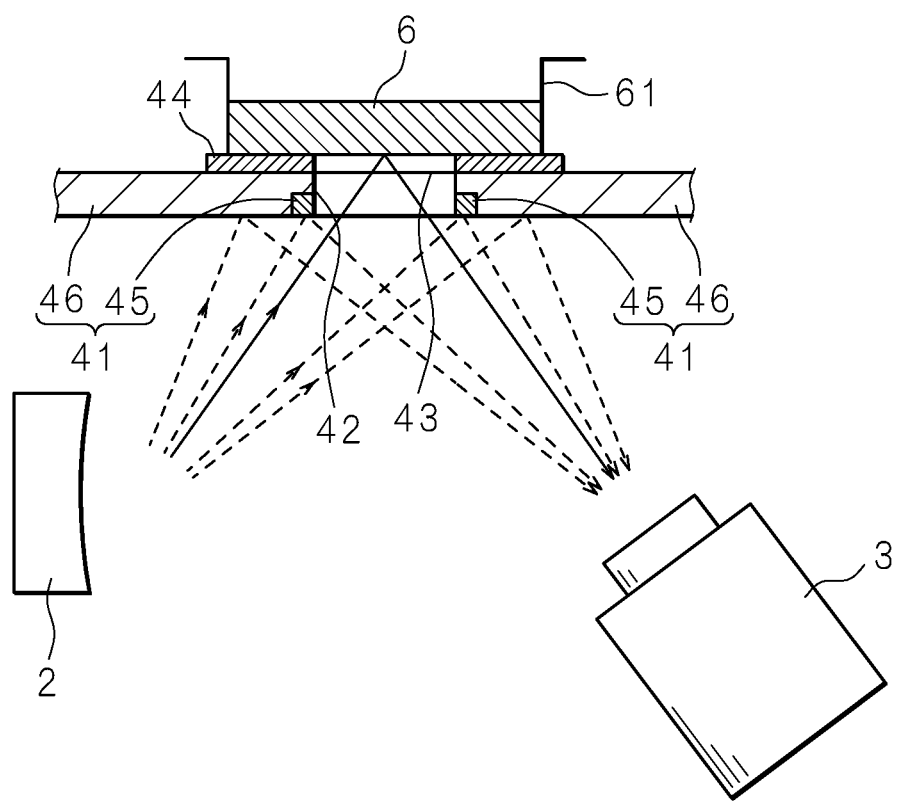
FIG. 9 is a schematic sectional view of the top board according to the second embodiment.

A second embodiment indicates an X-ray detection apparatus 10 which calibrates a position of peak in generated spectrum. FIG. 8 is a schematic plan view of a top board 41 according to the second embodiment. FIG. 9 is a schematic sectional view of the top board 41 according to the second embodiment. The top board 41 corresponds to a board member. FIG. 8 illustrates the top board 41 as viewed from a bottom side in FIG. 9. FIG. 9 illustrates a sectional view of the top board 41 taken along IX-IX line in FIG. 8.

The opening 42 goes through the top board 41. At least, when the X-ray detection apparatus 10 is operated, the opening 42 is closed by the X-ray transmission film 43. For example, the X-ray transmission film 43 is bonded on the top board 41 to close the opening 42, and the X-ray transmission film is sandwiched between the top board 41 and a pressing plate 44 having a through hole continuous to the opening 42. The pressing plate 44 is fixed to the top board 41 with screws (not shown), so that the X-ray transmission film 43 is fixed. The sample 6 contained in the sample container 61 is mounted over the opening 42 and the X-ray transmission film 43. The X-ray transmission film 43 allows the X-ray projected to the sample 6 to pass through and allows the X-ray fluorescence generated in the sample 6 to pass through.

As shown in FIG. 8, the shape of the opening 42 is almost perfect circle in a plan view. The top board 41 has a board portion 46 and a peripheral portion 45 disposed around the opening 42. The peripheral portion 45 has a ring-like shape which surrounds the opening 42 and forms an edge of the opening 42. The main components of the board portion 46 and the peripheral portion 45 are different from each other. For example, the main component of the board portion 46 is aluminum and the main component of the peripheral portion 45 is copper. At this time, aluminum is a first element and copper is a second element. As is the case with the first embodiment, the dispersive crystal 2 has a single-bent shape and generates the X-ray in the specific wavelength range, so that the X-ray in the specific wavelength range is converged to the linear focal line 25. As for a positional relationship between the dispersive crystal 2 and the top board 41, the X-ray in the specific wavelength range generated by the dispersive crystal 2 is projected to the top board 41. Further, the X-ray in the specific wavelength range is projected to an area having the opening 42 on the top board 41. The X-ray is projected to the top board 41 from the bottom side in FIG. 9.

The X-ray in the specific wavelength range is projected to the top board 41 such that it is converged to the focal line 25. In FIG. 8, a range of the focal line 25 where the X-ray in the specific wavelength range is converged to the surface of the top board 41 is indicated with a dotted line. The range of the focal line 25 corresponds to an area irradiated with the X-ray on the surface of the top board 41. That is, the area irradiated with the X-ray is distributed linearly corresponding to the focal line 25. The focal line 25 is longer than the peripheral portion 45 along the focal line 25 on the surface of the top board 41. That is, the linear area irradiated with the X-ray on the surface of the top board 41 is longer than the peripheral portion 45 on the surface of the top board 41. Thus, as shown in FIG. 8, a part of the X-ray projected to the top board 41 passes the opening 42 and other part of the X-ray is projected to the peripheral portion 45, while further other part of the X-ray is projected to the board portion 46.

The X-ray passing the opening 42 is projected to the sample 6 and then, the X-ray fluorescence is generated from the sample 6. The X-ray fluorescence passes the opening 42 and then, it is detected by the detecting unit 3. In FIG. 9, the X-ray projected to the sample 6 and the X-ray fluorescence generated from the sample 6 are indicated with as a solid line arrow. An X-ray fluorescence is generated from the peripheral portion 45 irradiated with the X-ray and then, the X-ray fluorescence is detected by the detecting unit 3. Further, an X-ray fluorescence is generated from the board portion 46 irradiated with the X-ray and then, the X-ray fluorescence is detected by the detecting unit 3. In FIG. 9, the X-ray projected to the peripheral portion 45 and the board portion 46, and the X-ray fluorescence generated from the peripheral portion 45 and the board portion 46 are indicated with a dotted line arrow.

Figure 10:
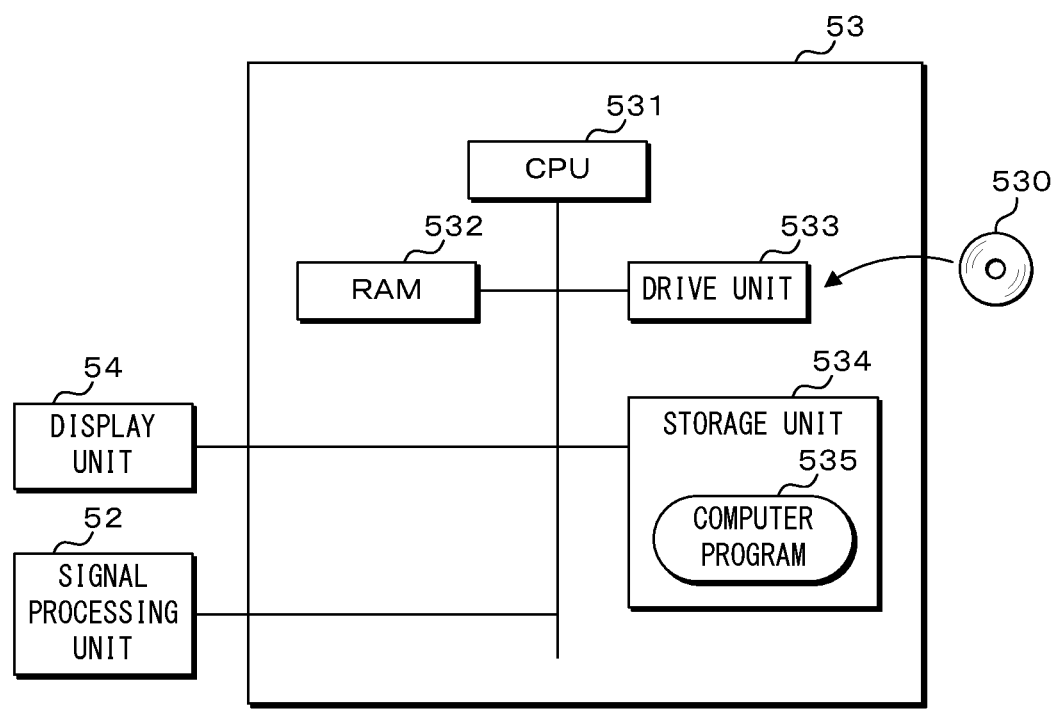
FIG. 10 is a block diagram showing an example of an inside structure of an analyzing unit according to the second embodiment.

FIG. 10 is a block diagram showing an example of an inside structure of an analyzing unit 53 according to the second embodiment. The analyzing unit 53 is formed of a computer such as a personal computer. The analyzing unit 53 includes a CPU (central processing unit) 531 for performing arithmetic operation, a random access memory (RAM) for storing temporary data generated with the arithmetic operation, a drive unit 533 for reading information from a recording medium 530 such as an optical disc and a nonvolatile storage unit 534. The storage unit 534 is, for example, a hard disc. The CPU 531 makes the drive unit 533 read the computer program 535 from the recording medium 530 and makes the storage unit 534 store the read computer program 535. The CPU 531 loads the computer program 535 from the storage unit 534 to the RAM 532 as required and makes the analyzing unit 53 execute a necessary processing according to the loaded computer program 535.

In the meantime, the computer program 535 may be downloaded to the analyzing unit 53 from an outside server unit (not shown) connected to the analyzing unit 53 through a communication network (not shown) and stored in the storage unit 535. Further, the analyzing unit 53 may be configured not to receive the computer program 535 from outside but include a storing means such as a read only memory (ROM) which stores the computer program 535. In these examples, the analyzing unit 53 may include no drive unit 533.

Further, the analyzing unit 53 is connected to the display unit 54 and the signal processing unit 52. The signal processing unit 52 generates a spectrum of the X-ray fluorescence detected by the detecting unit 3, and inputs data representing the spectrum to the analyzing unit 53. The analyzing unit 53 stores the data representing the spectrum in the storage unit 534. Alternatively, the signal processing unit 52 processes a signal outputted by the detecting unit 3 as required and inputs the processed signal to the analyzing unit 53. The CPU 531 of the analyzing unit 53 generates the spectrum of the X-ray fluorescence detected by the detecting unit 3 from the inputted signal and stores the data representing the spectrum in the storage unit 534. The configuration of the X-ray detection apparatus 10 is the same as the first embodiment except the top board 41 and the analyzing unit 53.

Figure 11:
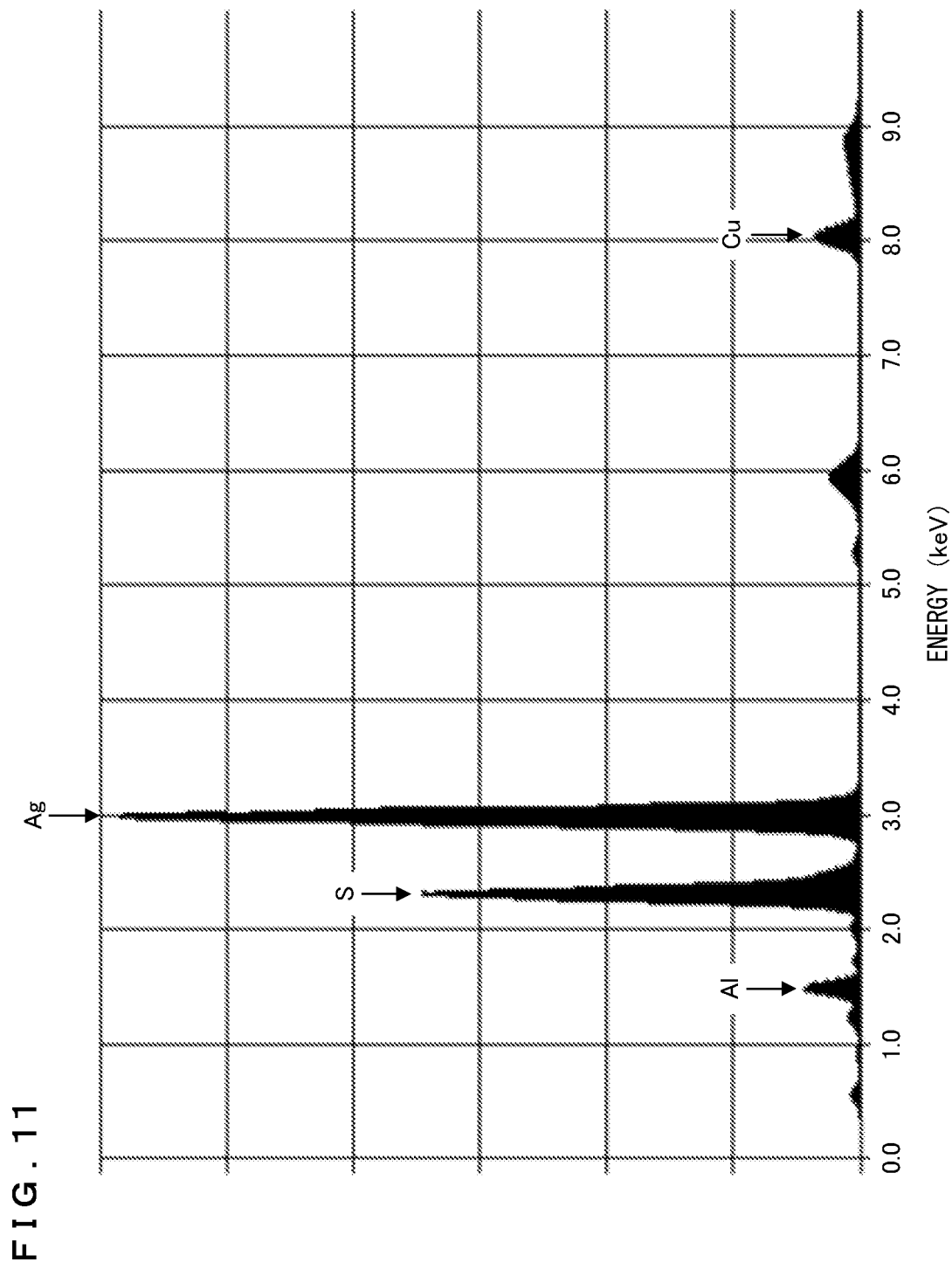
FIG. 11 is a characteristic diagram showing an example of the spectrum of X-ray fluorescence.

FIG. 11 is a characteristic diagram showing an example of the spectrum of X-ray fluorescence. The axis of abscissas indicates X-ray energy in the unit of keV and the axis of ordinates indicates the intensity of the X-ray fluorescence of each energy. For example, the intensity of the X-ray fluorescence corresponds to a count number. A peak position contained in the spectrum is specified by each energy value. Because the detecting unit 3 detects X-ray fluorescence generated from the sample 6, the spectrum contains a peak originating from each element in the sample 6. FIG. 11 shows an example using heavy oil as the sample 6. Sulfur (S) is contained in heavy oil as impurity and thus, the spectrum contains a peak originating from sulfur. The peak originating from sulfur appears at a position where the energy is approximately 2.3 keV. In FIG. 11, the peak originating from sulfur is indicated with S.

Because the detecting unit 3 detects the X-ray fluorescence generated from the peripheral portion 45 and the board portion 46, the spectrum contains a peak originating from a main component (first element) of the board portion 46 and a peak of a main component (second element) of the peripheral portion 45. In an example that the main component of the board portion 46 is aluminum (Al) and the main component of the peripheral portion 45 is copper (Cu), the spectrum contains peaks originating from aluminum and copper. A peak originating from aluminum appears at a position where the energy is approximately 1.5 keV. A peak originating from copper appears at a position where the energy is approximately 8 keV. In FIG. 11, the peak originating from aluminum is indicated with Al and the peak originating from copper is indicated with Cu. The peak of Al is a first peak and the peak of Cu is a second peak.

Further, X-ray generated in the X-ray generating unit 1 also enters the detecting unit 3. The energy of the X-ray generated in the X-ray generating unit 1 depends on a main component of the target 11. Thus, the spectrum contains a peak originating from the main component of the target 11. For example, the main component of the target 11 is silver (Ag) and the spectrum contains a peak originating from silver. The peak originating from silver appears at a position where the energy is approximately 3 keV. In FIG. 11, the peak originating from silver is indicated with Ag.

When generating the spectrum of the X-ray fluorescence, a position of the peak originating from each element (energy value corresponding to each peak) might be obtained slightly off a position (energy value) specified accurately according to theory or experiment. In the second embodiment, the analyzing unit 53 calibrates positions of the peaks contained in the spectrum based on the positions of the Al peak (first peak) and the Cu peak (second peak). The positions of the Al peak and the Cu peak in the spectrum are preliminarily specified accurately by theory or experiment. Data indicating the preliminarily specified positions of the Al peak and Cu peak is stored in the storage unit 534.

Figure 12:
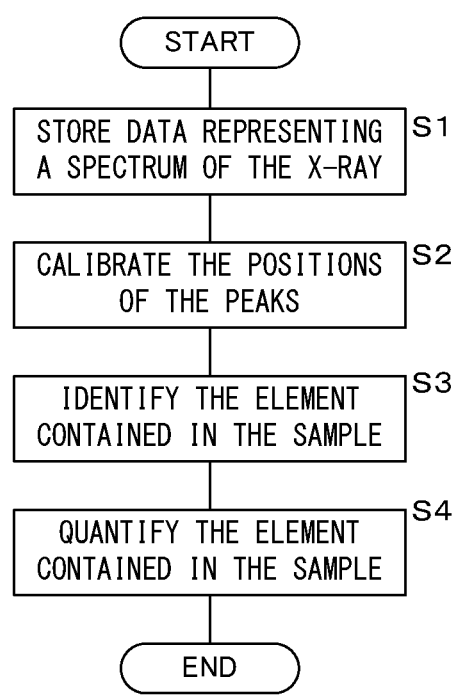
FIG. 12 is a flow chart showing steps of procedures which the analyzing unit according to the second embodiment executes.

FIG. 12 is a flow chart showing steps of procedures which the analyzing unit 53 according to the second embodiment executes. The storage unit 534 stores data representing a spectrum of the X-ray detected by the detecting unit 3 (S1). Next, the CPU 531 calibrates the positions of the peaks contained in the spectrum based on the peak of Al and the peak of Cu (S2).

In S2, first, the CPU 531 identifies the peaks near preliminarily specified positions for the Al peak and the Cu peak indicated by data stored by the storage unit 534 as Al peak and Cu peak respectively. Next, the CPU 531 adjusts the position of each peak contained in a spectrum so that the positions of the Al peak and the Cu peak turn to the same positions as the preliminarily specified positions. For example, the CPU 531 changes the position of each peak to shift the position of each peak equally. Alternatively, for example, the CPU 531 performs addition, subtraction, multiplication and division on a value indicating the position of each peak with a specific value. Alternatively, for example, the CPU 531 adjusts the position of each peak to change a distance in the spectrum between the Al peak and the Cu peak. The CPU 531 may change the position of each peak according to each of other plural methods. If the position of each peak is represented with energy, its energy value is changed. In this way, the CPU 531 calibrates the position in the spectrum of each peak by adjusting the position of each peak. The position in the spectrum of peak originating from each element is corrected to a position corresponding to the element by the calibration. Specially, the position of a peak located between the Al peak and the Cu peak in the spectrum become more accurate.

Next, the CPU 531 identifies the element contained in the sample 6 based on the spectrum in which each peak position is calibrated (S3). The peak originating from the element in the sample 6 is contained in the spectrum and the peak position is adjusted accurately by the calibration. A position of the peak of each element in the spectrum is preliminarily specified accurately according to theory or experiment, and the storage unit 534 stores data indicating the position of the peak originating from each element. In S3, the CPU 531 compares the position of the peak in the spectrum after calibration with the position of a peak originating from each element indicated by data stored in the storage unit 534. Then, the CPU 531 identifies the element by specifying the element whose peak positions substantially coincides with each other. For example, an element contained in the sample 6 is identified as sulfur.

Next, the CPU 531 quantifies the element contained in the sample 6 based on the spectrum (S4). In S4, the CPU 531 calculates the quantity or concentration of the element based on the intensity of the peak originating from the element in the sample 6 according to a predetermined method. For example, the CPU 531 calculates the quantity or concentration of sulfur contained in the sample 6 based on a value of the intensity or an integral value of the intensity of the S peak. Further, for example, the CPU 531 calculates the quantity or concentration of sulfur contained in the sample 6 based on comparison between the values of the intensities of the peak (Ag peak) originating from the target 11 and the S peak or the integral values of the intensities thereof. If the sample 6 is heavy oil, a concentration of sulfur is obtained as an impurity contained in heavy oil. The CPU 531 stores data indicating a quantification result in the storage unit 534. The analyzing unit 53 may display a processing result on the display unit 54. As a result, the analyzing unit 53 terminates the processing.

As described in detail above, according to the second embodiment, the X-ray is projected to the peripheral portion 45 and the board portion 46 as well as the sample 6, and the X-ray fluorescence generated from the sample 6, the peripheral portion 45 and the board portion 46 are detected by the detecting unit 3. The first element which is the main component of the board portion 46 and the second element which is the main component of the peripheral portion 45 are different from each other. The X-ray spectrum contains the first peak originating from the first element, the second peak originating from the second element and a peak originating from the element in the sample 6. The positions of the first peak and the second peak in the spectrum are preliminarily specified accurately according to theory or experiment. The position of the peak contained in the spectrum can be calibrated by matching the positions of the first peak and the second peak with their specified positions.

As a conventional calibration method, there is a method using a sample for calibration. A spectrum of the X-ray fluorescence generated from a calibration sample is generated and the peak position is calibrated based on the spectrum. The calibration sample is replaced with the sample 6 and then, a spectrum of an X-ray from the sample 6 is generated. The peak position in the spectrum is adjusted based on a calibration result using the calibration sample. Because the calibration is carried out based on other spectrum than the spectrum of the X-ray fluorescence from the sample 6, there is a fear that the calibration may not be carried out accurately. Because according to the second embodiment, the calibration is carried out using the spectrum containing the peak originating from the element in the sample 6, the calibration is carried out so that the position of the peak originating from the element in the sample 6 is more accurate. Because the position of the peak originating from the element in the sample 6 is more accurate, accurate identification of the element can be carried out and accurate quantification of the element can be carried out. Thus, the X-ray detection apparatus 10 can analyze an impurity contained in the sample 6 precisely.

In the example described in the second embodiment, the first element is aluminum and the first peak is Al peak. The second element is copper and the second peak is Cu peak. The Al peak and the Cu peak are located separately from each other to some extent without overlapping and further do not overlap the Ag peak originating from the target 11 or the S peak originating from the element in the sample 6. Because the Al peak and the Cu peak do not overlap other peaks, they are easy to identify and thus, they are suitable for a reference peak for calibration. Further, the S peak originating from the analysis target element is located between the Al peak and the Cu peak in the spectrum. Because the peak originating from the analysis target element is located between the two peaks serving as reference for calibration, the position of the peak originating from the analysis target element can be specified by calibration more accurately than when the peak originating from the analysis target element is not located between the two peaks.

The first element and the second element may be other elements than aluminum and copper. The first element and the second element are elements which keep the first peak and the second peak from overlapping each other in the X-ray fluorescence spectrum. Preferably, the first peak and the second peak do not overlap a peak originating from the target 11. Further preferably, the first peak and the second peak are located separately to some extent so that the peak originating from the analysis target element is located between the first peak and the second peak. For example, the first element and the second element may be any transition metal such as nickel, titanium, iron and cobalt. The board portion 46 and the peripheral portion 45 are composed of mainly these elements.

The analysis target element contained in the sample 6 may be other element than sulfur. Preferably, the peak originating from the analysis target element is located between the first peak and the second peak in the X-ray spectrum. If the peak originating from the analysis target element is located between the first peak and the second peak, the position of the peak originating from the analysis target element can be determined more accurately by calibration. For example, the analysis target element may be chlorine, phosphorous or silicon. The peak originating from each of these analysis target elements is contained in the X-ray fluorescence. In the meantime, even if the peak originating from an analysis target element is not located between the first peak and the second peak, the X-ray detection apparatus 10 can calibrate the position of the peak originating from the analysis target element. The sample 6 may be other material than heavy oil. The sample 6 may be solid. For example, the sample 6 may be resin.

Although the second embodiment indicates a configuration in which the shape of the opening 42 is an almost perfect circle in a plan view, the shape of the opening 42 may be other shape. Although the second embodiment indicates a configuration in which the peripheral portion 45 has a ring-like shape, the shape of the peripheral portion 45 may be other shape. For example, the shape of the peripheral portion 45 may be arc and the peripheral portion 45 may be divided to plural sections. Further, the peripheral portion 45 may be separated from the edge of the opening 42 at some distance. In any embodiments, the length of the focal line 25 is larger than the size of the peripheral portion 45 along the focal line 25.

Further, although the second embodiment indicates a configuration in which the X-ray is projected to the top board 41 using the dispersive crystal 2, the X-ray detection apparatus 10 may irradiate the top board 41 with the X-ray according to other method. Further, although the second embodiment indicates a configuration in which the top board 41 is irradiated with the X-ray linearly, the board portion 46 and the peripheral portion 45 may be irradiated with the X-ray such that it passes the opening 42. Further, although the second embodiment indicates an example that the X-ray generating unit 1 is a reflection type X-ray tube, the X-ray generating unit 1 may be a transmission type X-ray tube. Further, the X-ray detection apparatus 10 may be configured in wavelength dispersion type. The position of the peak in the spectrum may be specified by the wavelength or a wavenumber.

The present invention is not restricted to contents of the above-described embodiments but may be modified in various ways within a range indicated by claims. That is, embodiments which can be obtained by combining technical means appropriately modified within the range indicated by the claims are also included in the technical scope of the present invention.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

(Note 1)
An X-ray detection apparatus, comprising:
an X-ray generating unit;
a board member having an opening which an X-ray passes; and
a detecting unit that detects an X-ray generated from a sample irradiated with the X-ray that passes the opening,
wherein the board member includes:
a board portion composed of mainly a first element; and
a peripheral portion composed of mainly a second element that is different from the first element and disposed around the opening,
wherein the board member is irradiated with an X-ray, so that a part of the X-ray passes the opening while other part of the X-ray is projected to the board portion and the peripheral portion,
wherein the detecting unit detects an X-ray generated from the board portion and the peripheral portion.

(Note 2)
The X-ray detection apparatus according to Note 1,
wherein the peripheral portion has a ring-like shape that surrounds the opening,
the board member is irradiated with the X-ray so that an area irradiated with the X-ray is distributed linearly on a surface of the board member, and
the linear area irradiated with the X-ray on the surface of the board member is longer than the peripheral portion on the surface of the board member.

(Note 3)
The X-ray detection apparatus according to Note 2, further comprising
a dispersive crystal whose surface is irradiated with an X-ray generated from the X-ray generating unit in order to monochromatize the X-ray,
wherein the dispersive crystal has a shape that converges the monochromatized X-ray linearly,
the board member is irradiated with the monochromatized X-ray that is linearly converged.

(Note 4)
The X-ray detection apparatus according to Note 3,
wherein the dispersive crystal has a single-bent shape.

(Note 5)
The X-ray detection apparatus according to any one of Note 1 to 4 further comprising:

a spectrum generating unit for generating a spectrum of the X-ray detected by the detecting unit; and
an analyzing unit for analyzing an element based on the spectrum,
wherein the analyzing unit calibrates a position of the peak contained in the spectrum based on a peak originating from the first element and a peak originating from the second element.

(Note 6)
An analyzing method using a board member having a board portion composed of mainly a first element, an opening, and a peripheral portion composed of mainly a second element that is different from the first element and disposed around the opening, the analyzing method comprising:
projecting an X-ray to the board member, so that a part of the X-ray passes the opening while other part of the X-ray is projected to the board portion and the peripheral portion,
projecting the X-ray passing the opening to a sample,
detecting an X-ray generated from the sample irradiated with the X-ray passing the opening and an X-ray generated from the board portion and the peripheral portion,
generating a spectrum of the detected X-ray, and
calibrating a position of a peak contained by the spectrum in the spectrum, based on a first peak originating from the first element and a second peak originating from the second element.

(Note 7)
The analyzing method according to Note 6, further comprising
calibrating the position of a peak that exists between the first peak and the second peak in the spectrum, based on preliminarily specified positions of the first peak and the second peak in the spectrum.

(Note 8)
The analyzing method according to Note 6 or 7,
wherein a peak originating from the element contained in the sample is located between the first peak and the second peak in the spectrum.

(Note 9)
The analyzing method according to Note 6 to 8,
wherein the first element is aluminum and the second element is copper.

What is claimed is:
1. An X-ray detection apparatus comprising:
an X-ray generating unit;
a dispersive crystal whose surface is irradiated with an X-ray generated from the X-ray generating unit in order to monochromatize the X-ray; and
a detecting unit that detects an X-ray generated from a sample irradiated with the X-ray monochromatized by the dispersive crystal,
wherein the dispersive crystal has a single-bent shape containing the surface that is a concave surface formed by integrating concave curve lines continuously along an axis perpendicular to a plane including the concave curve line,
a direction in which a position on the surface irradiated with the X-ray generated from the X-ray generating unit moves is the direction along the axis, and
an optical axis of the X-ray generated from the X-ray generating unit is configured to move in a linear movement in response to thermal expansion in the X-ray generating unit.

2. The X-ray detection apparatus according to claim 1, further comprising
a holding portion that holds a sample, wherein the X-ray generating unit, the dispersive crystal and the holding portion are disposed such that the sample and a position where the X-ray is generated on the X-ray generating unit are located on a Rowland circle concerned with the surface, and a direction in which the optical axis of the X-ray generated from the X-ray generating unit moves is along the normal vector of a plane including the Rowland circle.

3. The X-ray detection apparatus according to claim 1, wherein the X-ray generating unit includes:

an electron generating unit; and a target that generates an X-ray when the electron generated from the electron generating unit collides with the target, and wherein the electron collides with a surface of the target nonvertically.

4. The X-ray detection apparatus according to claim 1, further comprising:

a spectrum generating unit that generates a spectrum of the X-ray detected by the detecting unit;

an analyzing unit that analyzes an element based on the spectrum generated by the spectrum generating unit; and a display unit that displays a result of the element analysis.

5. The X-ray detection apparatus according to claim 1, wherein the linear movement of the optical axis of the X-ray generated from the X-ray generating unit causes the position on the surface irradiated with the X-ray generated from the X-ray generating unit to move in the direction along the axis.

6. An X-ray detection apparatus comprising:

an X-ray generating unit;

a dispersive crystal whose surface is irradiated with an X-ray generated from the X-ray generating unit in order to monochromatize the X-ray; and a detecting unit that detects an X-ray generated from a sample irradiated with the X-ray monochromatized by the dispersive crystal, wherein the dispersive crystal has a single-bent shape containing the surface that is a concave surface formed by integrating concave curve lines continuously along an axis perpendicular to a plane including the concave curve line, wherein the X-ray generating unit includes:

an electron generating unit; and a target that generates an X-ray when the electron generated from the electron generating unit collides with the target, wherein the electron collides with a surface of the target nonvertically, wherein an optical axis of the X-ray generated from the X-ray generating unit is configured to move in a linear movement in response to the thermal expansion in the X-ray generating unit, and wherein a direction in which the position irradiated with the X-ray on the surface moves as the optical axis of the X-ray generated from the X-ray generating unit shifts due to thermal expansion of the target is along the axis.

7. The X-ray detection apparatus according to claim 6 further comprising:

a spectrum generating unit that generates a spectrum of the X-ray detected by the detecting unit;

an analyzing unit that analyzes an element based on the spectrum generated by the spectrum generating unit; and a display unit that displays a result of the element analysis.

8. An X-ray detection method using an X-ray generating unit, a dispersive crystal which has a surface that is a concave surface formed by integrating concave curve lines continuously along an axis perpendicular to a plane including the concave curve line and whose surface is irradiated with an X-ray generated from the X-ray generating unit in order to monochromatize the X-ray, and a detecting unit that detects an X-ray, the X-ray detection method comprising:

disposing the X-ray generating unit and the dispersive crystal such that a direction in which a position on the surface irradiated with the X-ray generated from the X-ray generating unit moves is along the axis;

projecting the X-ray monochromatized by the dispersive crystal to liquid sample; and detecting an X-ray generated from the sample irradiated with the X-ray by means of the detecting unit, wherein an optical axis of the X-ray generated from the X-ray generating unit is configured to move in a linear movement in response to thermal expansion in the X-ray generating unit.

* * * * *